United States Patent
Aoki et al.

(10) Patent No.: US 10,717,840 B2
(45) Date of Patent: Jul. 21, 2020

(54) METHOD FOR PRODUCING POLYETHYLENE-BASED RESIN EXTRUDED FOAM SHEET, POLYETHYLENE-BASED RESIN EXTRUDED FOAM SHEET, AND PLATE INTERLEAF SHEET USING THE SAME FOR GLASS SHEETS

(71) Applicant: JSP CORPORATION, Tokyo (JP)

(72) Inventors: Takeshi Aoki, Tochigi (JP); Takashi Nishimoto, Tochigi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 15/559,148

(22) PCT Filed: Mar. 22, 2016

(86) PCT No.: PCT/JP2016/059055
§ 371 (c)(1),
(2) Date: Sep. 18, 2017

(87) PCT Pub. No.: WO2016/152878
PCT Pub. Date: Sep. 29, 2016

(65) Prior Publication Data
US 2018/0066121 A1  Mar. 8, 2018

(30) Foreign Application Priority Data

Mar. 26, 2015 (JP) .................. 2015-064121
May 28, 2015 (JP) .................. 2015-108856

(51) Int. Cl.
| | | |
|---|---|---|
| *C08K 5/00* | (2006.01) | |
| *C08J 9/12* | (2006.01) | |
| *B29C 48/08* | (2019.01) | |
| *B29C 48/00* | (2019.01) | |
| *B32B 5/22* | (2006.01) | |

(Continued)

(52) U.S. Cl.
CPC ............ *C08J 9/12* (2013.01); *B29C 48/0012* (2019.02); *B29C 48/022* (2019.02); *B29C 48/08* (2019.02); *B32B 5/18* (2013.01); *B32B 5/22* (2013.01); *B32B 17/00* (2013.01); *B32B 27/065* (2013.01); *B32B 27/32* (2013.01); *C08J 9/0061* (2013.01); *C08J 9/08* (2013.01); *C08J 9/141* (2013.01); *C08K 5/0075* (2013.01); *B29C 44/505* (2016.11); *B29C 2948/92142* (2019.02); *B29K 2023/0633* (2013.01); *B29K 2423/00* (2013.01); *B29K 2471/00* (2013.01); *B29K 2995/0003* (2013.01); *B29K 2995/0063* (2013.01); *B29K 2995/0091* (2013.01); *B29K 2995/0097* (2013.01); *B29L 2031/712* (2013.01); *B29L 2031/7138* (2013.01); *B32B 2250/02* (2013.01); *B32B 2264/00* (2013.01); *B32B 2264/102* (2013.01); *B32B 2264/104* (2013.01); *B32B 2266/025* (2013.01); *B32B 2266/0207* (2013.01); *B32B 2266/0221* (2013.01); *B32B 2266/0228* (2013.01); *B32B 2307/21* (2013.01); *B32B 2307/308* (2013.01); *B32B 2307/3065* (2013.01); *B32B 2307/4026* (2013.01);

(Continued)

(58) Field of Classification Search
CPC ................................. C08J 9/12; C08J 2201/03
See application file for complete search history.

(56) References Cited

U.S. PATENT DOCUMENTS

| | | | | |
|---|---|---|---|---|
| 6,462,101 | B1 * | 10/2002 | Ramesh | ................. C08J 9/0061 521/134 |
| 2005/0238867 | A1 * | 10/2005 | Nakano | ................. C08K 5/0075 428/317.9 |

(Continued)

FOREIGN PATENT DOCUMENTS

| | | |
|---|---|---|
| JP | 10-226729 | 8/1998 |
| JP | 2005-194433 | 7/2005 |

(Continued)

OTHER PUBLICATIONS

Sanyo Chemical Industries. "Development of permanent antistatic agenst PELECTRON LMP-FS used in molding films and sheets . . . ". Published Feb. 26, 2015. Available at https://www.sanyo-chemical.co.jp/eng/topics/2015/02/development-of-permanent-antistat (Year: 2015).*

(Continued)

*Primary Examiner* — Michael M Dollinger
*Assistant Examiner* — Christina H. W. Rosebach
(74) *Attorney, Agent, or Firm* — Wenderoth, Lind & Ponack, L.L.P.

(57) ABSTRACT

Provided is a method for producing a polyethylene-based resin extruded foam sheet by extruding and foaming a foamable molten resin composition formed by kneading a mixture containing a low-density polyethylene, a physical blowing agent, and an antistatic agent, wherein the foam sheet has a thickness in a range of from 0.05 to 0.5 mm, and the antistatic agent is a polymeric antistatic agent having a melting point whose different from the melting point of the low-density polyethylene is in a range of from −10 to +10° C., and having a melt flow rate of 10 g/10 min or more. This method enables a novel polyethylene-based resin extruded foam sheet to be obtained that is of high quality such that formation of a small hole or a through-hole has been reduced or eliminated, and has both excellent strength and a shock-absorbing property despite a very small thickness even in medium- or long-term continuous production, and besides, exhibits a sufficient antistatic property, thus suitable as a glass plate interleaf sheet.

8 Claims, No Drawings

(51) Int. Cl.
*C08J 9/08* (2006.01)
*C08J 9/00* (2006.01)
*B32B 17/00* (2006.01)
*C08J 9/14* (2006.01)
*B32B 5/18* (2006.01)
*B32B 27/06* (2006.01)
*B32B 27/32* (2006.01)
*B29K 23/00* (2006.01)
*B29K 471/00* (2006.01)
*B29K 423/00* (2006.01)
*B29C 44/50* (2006.01)
*B29L 31/00* (2006.01)

(52) U.S. Cl.
CPC ... *B32B 2307/712* (2013.01); *B32B 2307/718* (2013.01); *B32B 2307/72* (2013.01); *B32B 2307/732* (2013.01); *B32B 2323/046* (2013.01); *B32B 2457/20* (2013.01); *B32B 2457/202* (2013.01); *B32B 2457/204* (2013.01); *C08J 2201/03* (2013.01); *C08J 2203/02* (2013.01); *C08J 2203/14* (2013.01); *C08J 2203/204* (2013.01); *C08J 2323/04* (2013.01); *C08J 2453/00* (2013.01)

(56) References Cited

U.S. PATENT DOCUMENTS

| | | | |
|---|---|---|---|
| 2010/0196641 A1* | 8/2010 | De Vos | C08J 9/0061 428/36.5 |
| 2015/0218332 A1* | 8/2015 | Nishimoto | C08J 9/08 428/220 |

FOREIGN PATENT DOCUMENTS

| | | | |
|---|---|---|---|
| JP | 2007-262409 | 10/2007 | |
| JP | 2008-7670 | 1/2008 | |
| JP | 2009-155423 | 7/2009 | |
| JP | 2012-20766 | 2/2012 | |
| JP | 2013-32478 | 2/2013 | |
| JP | 2013-177638 | 9/2013 | |
| JP | 2014-43553 | 3/2014 | |
| JP | 2015-199893 | 11/2015 | |
| WO | 2014/030513 | 2/2014 | |
| WO | WO-2014030513 A1 * | 2/2014 | C08J 9/08 |

OTHER PUBLICATIONS

Polymers: A Property Database Entry Name: LDPE by CRC Press, Taylor & Francis Group (Year: 2018).*
Machine translation of JP 08-230031 (Year: 1996).*
Derwent Abstract of JP 08-230031 (Year: 1996).*
Elias, H. and Mülhaupt, R. (2015). Plastics, General Survey, 1. Definition, Molecular Structure and Properties. In Ullmann's Encyclopedia of Industrial Chemistry, (Ed.). doi:10.1002/14356007.a20_543.pub2 (Year: 2015).*
International Search Report dated May 17, 2016 in International Application No. PCT/JP2016/059055.
English Translation of JP 2015-199893 previously cited in an IDS filed on Sep. 18, 2017.
English Translation of JP 2014-043553 previously cited in an IDS filed on Sep. 18, 2017.
English Translation of JP 2013-177638 previously cited in an IDS filed on Sep. 18, 2017.
English Translation of JP 2013-032478 previously cited in an IDS filed on Sep. 18, 2017.
English Translation of JP 2009-155423 previously cited in an IDS filed on Sep. 18, 2017.
English Translation of JP 2008-007670 previously cited in an IDS filed on Sep. 18, 2017.
English Translation of JP 2005-194433 previously cited in an IDS filed on Sep. 18, 2017.
English Translation of JP 10-226729 previously cited in an IDS filed on Sep. 18, 2017.

* cited by examiner

METHOD FOR PRODUCING POLYETHYLENE-BASED RESIN EXTRUDED FOAM SHEET, POLYETHYLENE-BASED RESIN EXTRUDED FOAM SHEET, AND PLATE INTERLEAF SHEET USING THE SAME FOR GLASS SHEETS

TECHNICAL FIELD

The present invention relates to a method for producing a novel polyethylene-based resin extruded foam sheet, a novel polyethylene-based resin extruded foam sheet, and an interleaf sheet for glass plates using the same.

BACKGROUND ART

A polyethylene-based resin extruded foam sheet (hereinafter also referred to as foam sheet), having an excellent antistatic performance, flexibility, and a shock-absorbing property, is capable of preventing damage and scratches of a packaged article, and has accordingly been widely used as a material for packaging a household appliance, glassware, a ceramic, and the like. Moreover, with the development of, and the increasing demand for, flat panel television and the like in recent years, a foam sheet having an antistatic property has been used as an interleaf sheet inserted between a pair of glass plates to prevent damage to a surface of the glass substrate during packaging and/or transportation of the glass substrate for use in an image display device, such as a liquid crystal display, a plasma display, or an electroluminescence display (Patent Literatures 1 and 2).

Glass plates having various thicknesses have heretofore been developed as a glass plate for use in an image display device such as a liquid crystal panel. Recently, very thin glass plates each having a thickness of about 0.5 mm or less have been manufactured from a viewpoint of weight reduction, energy saving, production cost, and the like. Use of a conventional thick foam sheet having a thickness of from about 1 mm to 2 mm as an interleaf sheet for such thin glass plates not only reduces the load efficiency, but also may damage a glass plate depending on a loading condition due to an excessively large thickness of the interleaf sheet relative to the glass plate.

Accordingly, a foam sheet having a small thickness is being developed as an interleaf sheet suitable for thin glass plates. However, production of a foam sheet having a small thickness presents a problem in that a small hole or a through-hole is readily formed in the foam sheet.

To address such a problem, the present inventors had already developed polyethylene-based resin extruded foam sheets each having an average thickness of 0.5 mm or less by using a unique foam control agent and the like (Patent Literatures 3 and 4).

These polyethylene-based resin extruded foam sheets are of high quality such that formation of a small hole or a through-hole has been reduced or eliminated despite an average thickness of 0.5 mm or less, and have an excellent antistatic performance and a shock-absorbing property.

CITATION LIST

Patent Literature

Patent Literature 1: JP 2007-262409 A
Patent Literature 2: JP 2012-20766 A
Patent Literature 3: JP 2014-43553 A
Patent Literature 4: WO 2014/030513 A

SUMMARY OF INVENTION

Technical Problem

It can be said that the polyethylene-based resin extruded foam sheets described above are suitable as an interleaf sheet for use with thin glass plates. However, there is a strong need for development of a polyethylene-based resin extruded foam sheet that is of high quality such that formation of a small hole, a through-hole, or the like has been stably reduced or eliminated even in medium- or long-term continuous production for from 2 days to 7 days or for other duration, and also exhibits an excellent antistatic performance.

The present invention has been made in view of the situation described above. It is an object of the present invention to provide a method for producing a novel polyethylene-based extruded resin foam sheet that is of high quality such that formation of a small hole or a through-hole has been reduced or eliminated, and has both excellent strength and shock-absorbing property despite a very small thickness even in medium- or long-term continuous production, and besides, exhibits a sufficient antistatic performance, thus suitable as a glass plate interleaf sheet; such a novel polyethylene-based resin foam sheet; and a glass plate interleaf sheet using the same.

Solution to Problem

The present invention provides a method for producing the novel polyethylene-based extruded resin foam sheet described below, the novel polyethylene-based resin extruded foam sheet, and a glass plate interleaf sheet using the same.

<1> A method for producing a polyethylene-based resin extruded foam sheet by extruding and foaming a foamable molten resin composition containing a low-density polyethylene, a physical blowing agent, and an antistatic agent, wherein, the foam sheet has a thickness in a range of from 0.05 to 0.5 mm, and the antistatic agent is a polymeric antistatic agent having a melting point whose difference from a melting point of the low-density polyethylene is in a range of from −10 to +10° C., and having a melt flow rate of 10 g/10 min or more.

<2> The method for producing a polyethylene-based resin extruded foam sheet according to <1>, wherein the melting point of the polymeric antistatic agent is 120° C. or less.

<3> The method for producing a polyethylene-based resin extruded foam sheet according to <1> or <2>, wherein a ratio of a melt flow rate of the low-density polyethylene to the melt flow rate of the polymeric antistatic agent (a melt flow rate of the low-density polyethylene/the melt flow rate of the polymeric antistatic agent) is 2 or less.

<4> The method for producing a polyethylene-based resin extruded foam sheet according to any one of <1> to <3>, wherein the polymeric antistatic agent is added in an amount in a range of from 3 to 25 parts by mass per 100 parts by mass of the low-density polyethylene.

<5> A low-density polyethylene-based resin extruded foam sheet containing an antistatic agent, and a low-density polyethylene as a matrix resin, wherein the foam sheet has a thickness in a range of from 0.05 mm to 0.5 mm and an apparent density in a range of from 20 to 450 kg/m³, and the antistatic agent is a polymeric antistatic agent having a melting point whose difference from a melting point of the low-density polyethylene is in a range of from −10° C. to +10° C., and having a melt flow rate of 10 g/10 min or more.

<6> An interleaf sheet for glass plates, comprising the extruded polyethylene-based resin foam sheet according to <5>.

Advantageous Effects of Invention

A production method of the present invention can provide a polyethylene-based resin foam sheet that is of high quality such that formation of a small hole or a through-hole has been reduced or eliminated, has a very small thickness, and exhibits an excellent antistatic performance in continuous production naturally for a short term such as several hours, and even for a medium or long term such as several days.

In addition, a novel polyethylene-based resin foam sheet according to the present invention is of high quality such that formation of a small hole or a through-hole has been reduced or eliminated despite a very small thickness, and besides, exhibits a sufficient antistatic performance.

Accordingly, widespread demand is foreseen for a novel polyethylene-based resin foam sheet of the present invention in the fields in which an antistatic performance and the like is highly demanded, in particular, as a glass plate interleaf sheet for preventing damage during transportation and/or packing of thin glass plates for use in an image display device, such as a liquid crystal display, a plasma display, or an electroluminescence display.

Moreover, a novel polyethylene-based resin foam sheet of the present invention can be continuously produced for a medium or long term, and is thus a foam sheet that provides a very high production efficiency from an industrial perspective.

DESCRIPTION OF EMBODIMENTS

A method for producing a polyethylene-based resin extruded foam sheet (hereinafter also referred to simply as foam sheet), of the present invention, is a method for producing a polyethylene-based resin extruded foam sheet by extruding and foaming a foamable molten resin composition containing a low-density polyethylene, a physical blowing agent, and an antistatic agent, where the foam sheet has a thickness in a range of from 0.05 to 0.5 mm, the antistatic agent is a polymeric antistatic agent having a melting point whose difference from the melting point of the low-density polyethylene is in a range of from −10 to +10° C., and having a melt flow rate of 10 g/10 minutes (min) or more.

(Method for Producing Foam Sheet)

In a method for producing a foam sheet, of the present invention, materials for forming the foam sheet including a low-density polyethylene, an antistatic agent, and an additive or additives such as a foam control agent and the like added as needed, are fed into an extruder, and the resultant is then heated to about 200° C., and kneaded, to form a molten resin composition. Next, a physical blowing agent is introduced under pressure into this molten resin composition, and the resultant is further kneaded to form a foamable molten resin composition in the extruder. Then, this foamable molten resin composition is cooled to a temperature suitable for foaming.

As used herein, a temperature suitable for foaming of a foamable molten resin composition refers to a temperature at which a foam layer is readily obtainable, and is preferably in a range of from [the melting point +0° C.] to [the melting point +15° C.] of the low-density polyethylene, and more preferably in a range of from [the melting point +2° C.] to [the melting point +10° C].

Then, the foamable molten resin composition is introduced into a circular die, and is extruded from a lip thereof at the front end of the die into air to foam the foamable molten resin composition. Thus, an extruded cylindrical foam is produced. This extruded cylindrical foam is pulled off while being expanded (blown up) by a mandrel, and is then cut open along the extrusion direction. Thus, a foam sheet can be obtained.

(Material for Forming Foam Sheet)

As described above, in a production method of the present invention, the formation is carried out by extruding and foaming the foamable molten resin composition containing a low-density polyethylene, an antistatic agent, a physical blowing agent, and as needed, a foam control agent, and other additive(s). Materials used to form a foam sheet will be described below.

(Low-Density Polyethylene)

The low-density polyethylene used may be polyethylene having a long chain branching structure, and having a density of 900 kg/m$^3$ or more and less than 930 kg/m$^3$. Such a resin exhibits good foamability, and a foam sheet obtained therefrom has excellent shock-absorbing characteristics. From the above-mentioned viewpoint, the low-density polyethylene preferably has a density of 910 kg/m$^3$ or more and 925 kg/m$^3$ or less. The low-density polyethylene preferably has a melting point of from 100 to 120° C., and more preferably from 105 to 115° C. The melting point of the low-density polyethylene can be determined using a method compliant to JIS K 7121-1987. More specifically, the analyte is heated from 40° C. to 200° C. at a rate of 10° C./min, and is thus melted, using a differential scanning calorimeter, and is then allowed to stand for 10 minutes at that temperature, after which temperature treatment is performed to cool the analyte to 40° C. at a rate of 10° C./min, followed by another heating from 40° C. to 200° C. at a heating rate of 10° C./min thus to obtain melting peaks. Then, the highest temperature of the highest melting peak among the melting peaks obtained is taken as the melting point.

Furthermore, the low-density polyethylene preferably has a melt flow rate of 5 g/10 min or more, more preferably 10 g/10 min or more, and still more preferably 15 g/10 min or more. The melt flow rate is determined at a temperature of 190° C. using a load of 2.16 kg according to JIS K 7210-1: 2014.

Note that if the low-density polyethylene is a mixture of two or more thereof, the melting point and the melt flow rate of that mixture are defined as the melting point and the melt flow rate previously determined for the material melted and kneaded in an extruder.

Examples of commercially available low-density polyethylene preferably used in the present invention include "product name: NUC 8321" (melt flow rate: 1.9 g/10 min, melting point: 112° C.) manufactured by NUC Corporation.

Insofar as the object and the effect of the present invention are not adversely affected, the low-density polyethylene may contain a thermoplastic resin, such as other polyethylene-based resin, a polypropylene-based resin, a polystyrene-based resin, or the like; an elastomer, such as an ethylene propylene rubber, a styrene-butadiene-styrene block copolymer, or the like; and/or the like.

The material referred to above as "other polyethylene-based resin" may be a resin containing 50 mole percent or more of ethylene component units. More specifically, examples thereof include a high-density polyethylene, a linear low-density polyethylene, a very low-density polyethylene, an ethylene-vinyl acetate copolymer, an ethylene-methyl methacrylate copolymer, an ethylene-ethyl acrylate copolymer, and the like, and also a mixture in combination of two or more thereof.

The blend content of the resin(s) other than the low-density polyethylene and of the elastomer(s) is preferably 20 parts by mass or less, more preferably 10 parts by mass or less, and particularly preferably 5 parts by mass or less, per 100 parts by mass of the low-density polyethylene. A resin other than the low-density polyethylene and/or an elastomer may be kneaded together with the low-density polyethylene to form a matrix resin that constitutes the foamable molten resin composition.

(Antistatic Agent)

A production method of the present invention requires use of a polymeric antistatic agent as the antistatic agent. This polymeric antistatic agent has a melting point difference from the melting point of the low-density polyethylene in a range of from −10° C. to +10° C., and has a melt flow rate of 10 g/10 min or more.

Use of such a polymeric antistatic agent enables an extruded polyethylene-based resin foam sheet to be obtained that are of high quality such that formation of a small hole, a through-hole, or the like has been reduced or eliminated even in medium- or long-term continuous production, and exhibits an excellent antistatic performance.

The exact reason for this is currently unclear. However, this may be because, as described below, a low melting point and a high melt flow rate of a polymeric antistatic agent used in the present invention provide reduction or elimination of crystal deposition, which would cause a small hole or a through-hole to be formed in the circular die as is seen with a conventional polymeric antistatic agent having a high melting point.

The difference between the melting point of the polymeric antistatic agent used in the present invention and the melting point of the low-density polyethylene ([melting point of low-density polyethylene]−[melting point of polymeric antistatic agent]) is in a range of from −10° C. to +10° C. However, in view of obtaining a high quality product through even longer continuous production, the melting point difference is preferably from −8° C. to +8° C., and still more preferably from −7° C. to +7° C. The melting point of the polymeric antistatic agent is preferably 125° C. or less, and more preferably 120° C. or less. Meanwhile, the lower limit of the melting point is generally about 100° C.

Note that the melting point of the polymeric antistatic agent can be determined in a similar manner to that used for the low-density polyethylene.

For a similar reason, the melt flow rate of the polymeric antistatic agent used in the present invention is 10 g/10 min or more, but is preferably 20 g/10 min or more, and more preferably 30 g/10 min or more. Meanwhile, the upper limit is generally about 100 g/10 min. The range described above is preferred since the antistatic agent will have high flowability, and provide an antistatic performance more effectively. Note that the melt flow rate of the polymeric antistatic agent is determined at a temperature of 190° C. using a load of 2.16 kg according to JIS K 7210-1: 2014.

Furthermore, the ratio of the melt flow rate of the low-density polyethylene B to the melt flow rate of the polymeric antistatic agent (melt flow rate of low-density polyethylene/melt flow rate of polymeric antistatic agent) is preferably 2 or less, more preferably 1 or less, and still more preferably 0.8 or less. The ratio in the range described above enables the polymeric antistatic agent to disperse in a net-like pattern or in a layered pattern, thereby providing an excellent antistatic performance more effectively. Meanwhile, the lower limit of that ratio is preferably 0.01 or more in general.

A polymeric antistatic agent preferably used in the present invention is one formed of a block copolymer of a polyether and a polyolefin, and examples of commercially available one may include Pelectron LMP (melting point: 114° C., melt flow rate: 30 g/10 min) manufactured by Sanyo Chemical Industries, Ltd.

The number average molecular weight of the polymeric antistatic agent used in the present invention is preferably 2000 or more, more preferably from 2000 to 100000, and still more preferably from 5000 to 80000. Note that the upper limit of the number average molecular weight of the polymeric antistatic agent is generally 500000. Use of the number average molecular weight in the range described above for the polymeric antistatic agent provides the antistatic performance more stably without being affected by humidity or the like.

The number average molecular weight described above can be determined using high-temperature gel permeation chromatography. For example, when the polymeric antistatic agent is formed primarily of polyether-ester-amide or polyether, the number average molecular weight described above is determined against a polystyrene standard under conditions of a sample concentration of 3 mg/ml using ortho-dichlorobenzene as the solvent, and a column temperature of 135° C. Note that the solvent and the column temperature described above are changed as appropriate depending on which polymeric antistatic agent is used.

(Blend Content of Antistatic Agent)

To obtain a high quality foam sheet having a sufficient antistatic performance, the content of the polymeric antistatic agent blended with the foam is preferably from 2 to 30 parts by mass, more preferably from 3 to 25 parts by mass, and still more preferably from 5 to 20 parts by mass, per 100 parts by mass of the low-density polyethylene contained in the foam.

(Surface Resistivity of Foam Sheet)

The method of the present invention includes addition of the polymeric antistatic agent described above, and can thus provide a surface resistivity of a surface of the foam sheet of from $1\times10^7$ to $1\times10^{13}\Omega$. Use of the surface resistivity in the range described above enables the foam sheet to exhibit a sufficient antistatic performance. From the above-mentioned viewpoint, the surface resistivity is preferably $5\times10^{12}\Omega$ or less, and more preferably $1\times10^{12}\Omega$ or less.

The surface resistivity in the present invention is determined in compliance with JIS K 6271: 2008 after adjustment of condition of specimens is performed as follows. More specifically, each specimen (100 mm in length×100 mm in width×thickness: thickness of the measured object) cut out of the foam sheet to be measured is left to stand for 36 hours in an atmosphere of relative humidity of 30% at a temperature of 20° C. to adjust the condition of the specimen. Next, a voltage is applied to each specimen in an atmosphere of relative humidity of 30% at a temperature of 20° C. under a condition of the applied voltage of 500 V. The surface resistivity is determined when one minute elapsed after the beginning of voltage application.

(Physical Blowing Agent)

In the method of the present invention, a low-density polyethylene is fed into an extruder, and the resultant mixture is heated and kneaded to form a molten resin. Next, a physical blowing agent is introduced under pressure, and the resultant is further kneaded to form a foamable molten resin composition. The physical blowing agent may either be an organic or inorganic physical blowing agent. Examples of organic physical blowing agent include aliphatic hydrocarbons, such as propane, normal butane, isobutane, normal pentane, isopentane, normal hexane, isohexane, and the like; cycloaliphatic hydrocarbons, such as cyclopentane, cyclohexane, and the like; hydrocarbon chlorides, such as methyl chloride, ethyl chloride, and the like; hydrocarbon fluorides, such as 1,1,1,2-tetrafluoroethane, 1,1-difluoroethane, and the like; ethers such as dimethyl ether, methyl ethyl ether, and the like; and alcohols, such as methanol, ethanol, and the like.

Examples of inorganic physical blowing agent include oxygen, nitrogen, carbon dioxide, air, and water. These physical blowing agents may be used in combination of two or more thereof. Among these, an organic physical blowing agent is preferred from a viewpoint of foamability, and among others, one formed primarily of normal butane, isobutane, or a combination of these is particularly suitable.

The amount added of the physical blowing agent needs to be adjusted depending on which physical blowing agent is used and on the intended apparent density of the foam sheet. For example, if a foam sheet having an apparent density of from 20 to 450 kg/m$^3$ is to be obtained using, as the physical blowing agent, a physical blowing agent such as a butane mixture formed of 30 mass % of isobutane and 70 mass % of normal butane, the amount added is from 4 to 35 parts by mass, preferably from 5 to 30 parts by mass, and more preferably from 6 to 25 parts by mass, per 100 parts by mass of the matrix resin that constitutes the foamable molten resin composition.

(Foam Control Agent)

In the method of the present invention, a foam control agent may be fed, together with the low-density polyethylene, to the extruder. Examples of the foam control agent applicable include an inorganic powder material and a chemical blowing agent. The inorganic powder material may be exemplified by talc, zeolite, silica, calcium carbonate, and the like.

The chemical blowing agent may be exemplified by azodicarbonamide, hydrazodicarbonamide, azo-bis(isobutyronitrile), sodium bicarbonate (baking soda); and a baking soda-citric acid-based chemical blowing agent, which is a mixture of sodium bicarbonate and citric acid or a monoalkali metal citrate (such as monosodium citrate); and the like. Among these chemical blowing agents, to obtain a foam sheet having a small bubble diameter and an excellent shock-absorbing property, a baking soda-citric acid-based chemical blowing agent is preferred.

Use of a baking soda-citric acid-based chemical blowing agent having an average particle size of from 3 to 8 μm can more effectively prevent formation of a through-hole penetrating the foam sheet, and is thus preferred. From such viewpoint, the average particle size is more preferably from 4 to 7 μm. Furthermore, the maximum particle size of a chemical blowing agent is preferably 100 μm or less, and more preferably 80 μm or less. The average particle size described above means the median diameter (d50) determined by particle size distribution measurement using a laser diffraction scattering method. Furthermore, the maximum particle size of a chemical blowing agent described above is determined as follows. A group of particles of about 1 to 3 mg sampled at random from the chemical blowing agent are observed under magnification using an optical microscope or the like, and the major diameter of the particle having the largest major diameter in the group of particles is taken as the maximum particle size of that chemical blowing agent.

The amount added of the foam control agent is preferably from 0.1 to 3 parts by mass, and more preferably from 0.2 to 2 parts by mass, per 100 parts by mass of the matrix resin that constitutes the foamable molten resin composition. The amount added in the range described above allows the bubble diameter to be readily adjusted to fall within a desired range, and is thus preferred.

(Other Additives)

In the method of the present invention, in addition to the constituents described above, various additives may be added to the extent that the effects of the present invention may not be reduced. Examples of such additives include an antioxidant, a heat stabilizer, a weathering stabilizer, an ultraviolet absorber, a flame retardant, an inorganic filler, an antimicrobial agent, a coloring agent, and the like.

In a production method of the present invention, although it is currently unclear why a foam sheet is obtainable in which formation of a small hole or a through-hole has been reduced or eliminated even in medium- or long-term continuous production, and which also exhibits a sufficient antistatic property, the reason is inferred as follows.

Conventionally, in an extruded polyethylene-based resin foam sheet containing an antistatic agent of the kind described above, a polymeric antistatic agent having a melting point of about 135° C., which is different from the melting point of the low-density polyethylene (matrix resin) by +20° C. or more, has been used as the antistatic agent as described later in Comparative Examples. When such conventional polymeric antistatic agent is used, a high temperature in the extruder maintained at a temperature of about 200° C. as described above causes the polymeric antistatic agent to be completely dissolved in the foamable molten resin composition, leaving no crystalline deposit of unmolten polymeric antistatic agent.

However, as described above, this foamable molten resin composition is cooled to a temperature suitable for foaming, specifically, to a temperature of about 120° C. (melting point of the low-density polyethylene-based resin + about 10° C. or less) upon introduction into the circular die. In view of a conventional polymeric antistatic agent having a melting point of about 135° C., it is thought that a portion of the polymeric antistatic agent melted in the extruder crystallizes to form a deposit at such cooling temperature.

Thus, extrusion of the foamable molten resin composition containing these precipitated crystals in the circular die results in gradual accumulation and adhesion of the precipitated crystals onto a wall surface of the circular die. In an early stage (several hours), due to the small amount of the accumulation and adhesion, these remaining crystals have only a small effect on the surface of the foam. However, for example, in continuous production for 2 days, as well as in long-term continuous production for 7 days, the amount of accumulation and the amount of adhesion of the remaining crystals increase dramatically, finally causing the remaining crystals to contact with a surface of the foam, and to drop, thereby producing a small hole or a through-hole in the foam sheet. Thus, a high quality foam sheet cannot be obtained.

In contrast, the present invention uses, as an antistatic agent, a polymeric antistatic agent having a melting point whose difference from the melting point of the low-density polyethylene-based resin is in a range of from −10° C. to +10° C., and also having a melt flow rate of 10 g/10 min or more. Therefore, similarly to the conventional polymeric antistatic agent, the polymeric antistatic agent is completely dissolved in the foamable molten resin composition, leaving no crystalline precipitation of unmolten polymeric antistatic agent in the extruder.

In addition, this foamable molten resin composition is cooled to a temperature suitable for foaming as described above, specifically, to a temperature that is the melting point of the low-density polyethylene-based resin + about 10° C. (e.g., 120° C.). Here, since the polymeric antistatic agent used in the present invention has a melting point whose difference from the melting point of the low-density polyethylene is in a range of from −10° C. to +10° C., it is thought that in such cooling temperature, the polymeric antistatic agent is completely dissolved also in the circular die, similarly to when in the extruder, and thus crystallization of unmolten polymeric antistatic agent is reduced or eliminated.

Accordingly, in the present invention, unlike a case in which a conventional polymeric antistatic agent is used, a foam sheet is obtainable that is of high quality such that formation of a small hole or a through-hole probably caused by the polymeric antistatic agent has been reduced or eliminated, and has both excellent strength and shock-absorbing property despite a small thickness, naturally in a short-term continuous production for several hours, and even in medium- or long-term continuous production for several days, and besides, exhibits a sufficient antistatic performance.

As described above, a method for producing a foam sheet of the present invention reduces or eliminates formation of a small hole or a through-hole naturally for a short term such as several hours, and even for a medium or long term as long as several days, and thus provides an excellent productivity in continuous production. Thus, in production of a foam sheet of the present invention, the foam sheet can be reeled off in a roll form with a length of 100 m or more, and preferably 300 m or more during production, depending on the thickness and/or on the widthwise length.

In contrast, in a conventional production method, a defect such as a small hole or a through-hole may occur in the foam sheet in continuous production for a medium or long term such as several days. In such a case, the foam sheet needs once cutting off from the roll, and after removing the defect portion, again reeling the foam sheet in a roll form. Such procedure significantly reduces the production efficiency.

From the above-mentioned viewpoint, in the present invention, more preference is given to a smaller number of through-holes having a diameter of 1 mm or more present in the polyethylene-based resin extruded foam sheet. More specifically, the number of through-holes of 1 mm or more formed in one hour after 2 days or 7 days from the start of production is preferably less than 3.

(Thickness of Foam Sheet)

A foam sheet obtained by a production method of the present invention has a thickness (average thickness) of 0.05 mm or more and 0.5 mm or less. From a viewpoint of a shock-absorbing property and usability of an interleaf sheet, the lower limit of the average thickness is preferably 0.07 mm, more preferably 0.1 mm, and still more preferably 0.15 mm, while the upper limit of the average thickness is preferably 0.4 mm, more preferably 0.35 mm, and still more preferably 0.3 mm.

The average thickness of a foam sheet can be measured using Off-line Thickness Measuring System TOF-4R manufactured by Yamabun Electronics Co., Ltd., or the like. First, thickness is measured at 1 cm intervals across the entire width of the foam sheet. On the basis of these thicknesses of the foam sheet measured at 1 cm intervals, the arithmetic average thickness across the entire width is calculated. Note that the foam sheet used for the measurement described above needs condition adjustment for 24 hours or longer under conditions of a temperature of 23±5° C. and relative humidity of 50%.

(Apparent Density of Foam Sheet)

A foam sheet obtained by a production method of the present invention has an apparent density preferably in a range of from 20 to 450 kg/m$^3$. The apparent density in the range described above provides an excellent shock-absorbing property to the foam sheet as a wrapping material, such as an interleaf sheet, and is thus preferred. From such viewpoint, the apparent density is more preferably from 30 to 300 kg/m$^3$, and still more preferably from 50 to 200 kg/m$^3$.

Note that the apparent density of a foam sheet can be determined by dividing the weight per unit area (g/m$^2$) of the foam sheet by the average thickness of the foam sheet, and then converting the unit of the quotient to [kg/m$^3$].

In addition, the ratio between the discharge port diameter of the circular die and the diameter of the mandrel (blow-up ratio: diameter of mandrel/lip diameter of circular die) is preferably designed to range from 2.2 to 3.8. The range described above prevents corrugation in a circumferential direction that would otherwise occur upon foaming, thus providing excellent thickness accuracy, and also prevents excessive flattening of bubbles in the width direction. Therefore, the range described above can provide an improved foam sheet, and is thus preferred.

(Foam Sheet)

As described above, a novel polyethylene-based resin extruded foam sheet according to the present invention is of high quality such that formation of a small hole or a through-hole has been reduced or eliminated despite a very small thickness, and besides, exhibits a sufficient antistatic performance.

Thus, a novel polyethylene-based resin extruded foam sheet of the present invention is broadly and very useful in the fields in which an antistatic performance and the like are highly demanded, in particular, as a glass plate interleaf sheet for preventing damage during transportation and/or packing of thin glass plates for use in an image display device, such as a liquid crystal display, a plasma display, or an electroluminescence display. Furthermore, this foam sheet can be continuously produced for a medium or long term, and is thus a foam sheet that provides a very high production efficiency from an industrial perspective.

EXAMPLES

The present invention will be described in more detail below by Examples and Comparative Examples. Note that the present invention is not limited to Examples.

[Low-Density Polyethylene]

The low-density polyethylenes used in Examples and Comparative Examples are shown in Table 1.

TABLE 1

| Abbreviation | Material | Density (g/cm$^3$) | Melting Point (° C.) | MFR (g/10 min) |
|---|---|---|---|---|
| LDPE1 | Low-density polyethylene | 0.917 | 107 | 16.3 |
| LDPE2 | Low-density polyethylene | 0.922 | 112 | 2.4 |

The antistatic agents used in Examples and Comparative Examples are shown in Table 2.

TABLE 2

| Abbreviation | Material | | Manufacturer | Product Name | Melting Point | Surface Specific Resistance | MFR |
|---|---|---|---|---|---|---|---|
| AS 1 | Polymeric antistatic agent | Polyether-polyolefin block copolymer | Sanyo Chemical Industries, Ltd. | Pelectron LMP | 114° C. | $4 \times 10^6$ Ω/sq. | 30 |
| AS 2 | Polymeric antistatic agent | Polyether-polyolefin block copolymer | Sanyo Chemical Industries, Ltd. | Pelectron HS | 135° C. | $4 \times 10^6$ Ω/sq. | 6 |
| AS 3 | Polymeric antistatic agent | Polyether-polyolefin block copolymer | Sanyo Chemical Industries, Ltd. | Pelestat 300 | 135° C. | $1 \times 10^8$ Ω/sq. | 32 |
| AS 4 | Polymeric antistatic agent | Ethylene-based ionomer resin | DuPont-Mitsui Polychemicals Co., Ltd. | SD100 | 92° C. | $3 \times 10^6$ Ω/sq. | 5 |

[Foam Control Agent]

The foam control agent used in Examples and Comparative Examples was a mixture of sodium bicarbonate and monosodium citrate having a weight ratio of 1:1. A chemical blowing agent having an average particle size (d50) of 6 μm and a maximum particle size of 30 μm was used.

[Equipment]

A first extruder (tandem extruder) including an extruder having a barrel inner diameter of 115 mm for forming a foam layer, and an extruder having a barrel inner diameter of 150 mm downstream thereof connected together, was used as the foam sheet production equipment. Note that temperature control of lip mold of the die was performed on each of the portions formed by dividing the lip mold into eight.

Examples 1 to 3 and Comparative Examples 1 to 5

The low-density polyethylene-based resins, the antistatic agents, and the foam control agent shown in Table 3 were fed to the raw material inlet of the extruder with the formulation shown in Table 3, and the resultant mixture was heated and kneaded to form a resin melt having a controlled temperature of 200° C. A mixed butane formed of 70 mass % of normal butane and 30 mass % of isobutane was introduced under pressure into the resin melt as the physical blowing agent with the blend contents shown in Table 3 per 100 parts by mass of the polyethylene-based resins, and the resultant mixtures were heated and kneaded, followed by cooling to form foamable molten resin compositions having the resin temperatures shown in Table 3. Then, these foamable molten resin compositions were introduced to the circular die for extrusion.

Next, the foamable molten resin compositions were extruded into air through the lip of the die to form single-layered cylindrical foams containing the antistatic agents. While being expanded in diameter by the mandrel at the blow-up ratios shown in Table 3, the cylindrical foams were pulled out at the rates shown in Table 3, were cut open along the extrusion direction, and were reeled off in a roll form with a predetermined length to yield monolayer foam sheets containing the antistatic agents.

Note that the blend contents of the antistatic agents, the foam control agent, and the physical blowing agent shown in Table 3 represent the amounts in parts by mass of the antistatic agents, the foam control agent, and the physical blowing agent, per 100 parts by mass of the resins contained in the foam layers.

Physical properties of the foam sheets obtained in Examples and Comparative Examples are shown in Table 4.

TABLE 3

| | Foam Sheet | | | | | | | | | | |
|---|---|---|---|---|---|---|---|---|---|---|---|
| | Resin | | | | | Foam Control Agent Blend | Blowing Agent Blend | Production Condition | | | |
| | Material | Material | Blend Ratio (LDPE/AS) | MFR Ratio (LDPE/AS) | Melting Point Difference ° C. | Content Parts By Mass | Content Parts By Mass | Resin Temperature ° C. | Discharge Rate kg/h | Pull-out Rate m/min | Blow-up Ratio |
| Example 1 | LDPE1 | AS 1 | 92/8 | 0.54 | 7 | 1.9 | 13.3 | 110 | 90 | 64 | 3.32 |
| Example 2 | LDPE2 | AS 1 | 92/8 | 0.08 | 2 | 1.2 | 19.2 | 114 | 90 | 46 | 3.62 |
| Example 3 | LDPE1 | AS 1 | 80/20 | 0.54 | 7 | 1.9 | 13.3 | 110 | 90 | 64 | 3.32 |
| Comparative Example 1 | LDPE1 | AS 2 | 92/8 | 2.72 | 28 | 2.1 | 13.2 | 110 | 90 | 63 | 3.32 |
| Comparative Example 2 | LDPE1 | AS 3 | 92/8 | 0.51 | 28 | 2.0 | 13.3 | 110 | 90 | 63 | 3.32 |
| Comparative Example 3 | LDPE1 | AS 4 | 92/8 | 3.26 | −15 | 2.0 | 13.1 | 110 | 90 | 64 | 3.32 |
| Comparative Example 4 | LDPE1 | AS 4 | 80/20 | 3.26 | −15 | 1.9 | 13.3 | 110 | 90 | 65 | 3.32 |
| Comparative Example 5 | LDPE2 | AS 3 | 92/8 | 0.08 | 23 | 1.3 | 18.9 | 114 | 90 | 46 | 3.62 |

TABLE 4

| | Entire Foam Sheet | | | | Evaluation | | |
|---|---|---|---|---|---|---|---|
| | | Apparent | | | Hole Resistance | | |
| | Thickness (mm) | Density (kg/m$^3$) | Basis Weight (g/m$^2$) | Width (mm) | Mid term (2 days) | Long term (7 days) | Surface Resistivity (Ω) |
| Example 1 | 0.24 | 94 | 22.5 | 1040 | ○ | ○ | $2.1 \times 10^{12}$ |
| Example 2 | 0.47 | 53 | 24.8 | 1320 | ○ | ○ | $7.2 \times 10^{11}$ |
| Example 3 | 0.24 | 94 | 22.5 | 1040 | ○ | ○ | $8.2 \times 10^{10}$ |
| Comparative Example 1 | 0.24 | 93 | 22.4 | 1060 | Δ | x | $6.8 \times 10^{11}$ |
| Comparative Example 2 | 0.22 | 102 | 22.5 | 1060 | Δ | x | $5.3 \times 10^{12}$ |
| Comparative Example 3 | 0.21 | 105 | 22.1 | 1060 | ○ | ○ | $4.5 \times 10^{15}$ |
| Comparative Example 4 | 0.24 | 93 | 22.3 | 1040 | x | — | $3.2 \times 10^{12}$ |
| Comparative Example 5 | 0.47 | 53 | 24.7 | 1310 | ○ | Δ | $1.5 \times 10^{12}$ |

(Study Result of Table 4)

Table 4 shows that the use of a unique polymeric antistatic agent (AS 1: melting point 114° C.) having a melting point difference of +7° C. from the melting point of the low-density polyethylene enabled the foam sheets obtained in Examples 1 to 3 to reduce or eliminate formation of a through-hole on a surface thereof naturally in mid-term continuous production for 48 hours (2 days), and even in long-term continuous production for 168 hours (7 days), and besides, to exhibit a sufficient antistatic performance. Thus, it is shown that a foam sheet of the present invention is a stably- and mass-producible foam sheet having an antistatic performance, and is therefore of particular value from an industrial perspective.

In contrast, the foam sheets obtained in Comparative Examples 1 and 2 respectively use the polymeric antistatic agents (AS 2, AS 3) each having a high melting point (135° C.) and thus having a melting point difference of 28° C. from the melting point of the low-density polyethylene undergo formation of through-holes even in mid-term continuous production for 48 hours (2 days), and more intensively in long-term continuous production for 168 hours (7 days). These results show that these foam sheets lead to low production efficiency.

The foam sheet obtained in Comparative Example 3 uses the polymeric antistatic agent (AS 4: melting point 92° C.) having a melting point difference of −15° C. from the melting point of the low-density polyethylene. A low blend content resulted in a foam sheet of high quality without small holes or through-holes, but a sufficient antistatic performance was not provided. Thus, as described in Comparative Example 4, the blend content thereof was then increased to enable the foam sheet to exhibit a sufficient antistatic performance, but in this case, in turn, the high content of AS 4 having a low melt flow rate made it difficult to stably produce the foam sheet.

The foam sheet obtained in Comparative Example 5 is comparable to that of Example 2. It is shown that an antistatic agent having a large melting point difference from the melting point of the low-density polyethylene-based resin is unsuitable for long-term continuous production.

In this regard, the physical properties shown in Table 4 were determined as follows.

(Thickness of Foam Sheet)

The average thickness of each foam sheet was measured using Off-line Thickness Measuring System TOF-4R manufactured by Yamabun Electronics Co., Ltd. First, thickness was measured at 1 cm intervals across the entire width of each foam sheet. On the basis of these thicknesses of each foam sheet measured at 1 cm intervals, the arithmetic average thickness across the entire width was calculated. Note that the foam sheets used for the measurement described above had been treated by condition adjustment for 48 hours under conditions of a temperature of 23±5° C. and relative humidity of 50%.

(Basic Weight of Foam Sheet)

The basic weight of each foam sheet was determined by cutting out a rectangular specimen having a width of 250 mm across the entire width of the foam sheet, dividing the weight (g) of that specimen by the area (sheet width (mm)× 250 mm) of that specimen, and converting the quotient into a weight (g) per 1 m$^2$ of that foam sheet, and the value obtained was taken as the basic weight (g/m$^2$) of the foam sheet.

(Apparent Density of Foam Sheet)

The apparent density of each foam sheet was determined by dividing the basic weight (g/m$^2$) of the foam sheet obtained using the procedure described above by the average thickness of the foam sheet obtained as described above.

(Formation of Through-Hole etc.)

(Short Term)

The surface of each foam sheet was observed for one hour using a defect detector during production of the foam sheet when 48 hours had elapsed since the start of the production, and was evaluated based on the following criteria.

Good: the number of through-holes of 1 mm or more formed in one hour when 48 hours had elapsed was less than 3

Poor: the number of through-holes of 1 mm or more formed in one hour when 48 hours had elapsed was 3 or more and less than 5

Bad: the number of through-holes of 1 mm or more formed in one hour when 48 hours had elapsed was 5 or more (Long Term)

The surface of each foam sheet was observed for one hour using a defect detector during production of the foam sheet when 168 hours had elapsed since the start of the production, and was evaluated based on the following criteria.

Good: the number of through-holes of 1 mm or more formed in one hour when 168 hours had elapsed was less than 3

Poor: the number of through-holes of 1 mm or more formed in one hour when 168 hours had elapsed was 3 or more and less than 5

Bad: the number of through-holes of 1 mm or more formed in one hour when 168 hours had elapsed was 5 or more Evaluation not applicable (foam sheet could not be formed)

(Surface Resistivity)

The surface resistivity was determined in compliance with JIS K 6271: 2008 after adjustment of condition of each specimen was performed as follows. More specifically, five specimens (100 mm in length×100 mm in width×thickness: thickness of the measured object) cut out at random from the foam sheet to be measured were left to stand for 36 hours in an atmosphere of relative humidity of 50% at a temperature of 23° C. to adjust the condition of the specimens. Next, a voltage was applied to each of the specimens in an atmosphere of relative humidity of 50% at a temperature of 23° C. under a condition of the applied voltage of 500 V. When one minute had elapsed since the beginning of voltage application, the surface resistivities were determined, and the arithmetic average thereof (five specimens×both sides [n=10]) was taken as the surface resistivity of the layered foam sheet.

The invention claimed is:

1. A method for producing a polyethylene-based resin extruded foam sheet by extruding and foaming a foamable molten resin composition containing a low-density polyethylene, a physical blowing agent, and an antistatic agent,
    wherein the foam sheet has a thickness in a range of from 0.05 to 0.5 mm,
    wherein the low density polyethylene has a melt flow rate of about 15 g/10 minutes or more,
    wherein the antistatic agent is a polymeric antistatic agent having a melting point whose difference from a melting point of the low-density polyethylene is in a range of from −10 to +10° C., and has a melt flow rate of 10 g/10 min or more,
    wherein the foamable molten resin composition does not contain a high-density polyethylene, and
    wherein the foam sheet is reeled in a rolled shape.

2. The method for producing a polyethylene-based resin extruded foam sheet according to claim 1, wherein the melting point of the polymeric antistatic agent is 120° C. or less.

3. The method for producing a polyethylene-based resin extruded foam sheet according to claim 1, wherein a ratio of a melt flow rate of the low-density polyethylene to the melt flow rate of the polymeric antistatic agent (a melt flow rate of the low-density polyethylene/the melt flow rate of the polymeric antistatic agent) is 2 or less.

4. The method for producing a polyethylene-based resin extruded foam sheet according to claim 1, wherein the polymeric antistatic agent is added in an amount in a range of from 3 to 25 parts by mass per 100 parts by mass of the low-density polyethylene.

5. A polyethylene-based resin extruded foam sheet containing an antistatic agent, and a low-density polyethylene as a matrix resin,
    wherein the foam sheet has a thickness in a range of from 0.05 mm to 0.5 mm and an apparent density in a range of from 20 to 450 kg/m$^3$,
    wherein the low density polyethylene has a melt flow rate of about 15 g/10 minutes or more,
    wherein the antistatic agent is a polymeric antistatic agent having a melting point whose difference from a melting point of the low-density polyethylene is in a range of from −10° C. to +10° C., and having a melt flow rate of 10 g/10 min or more,
    wherein the polyethylene-based resin extruded foam sheet does not contain a high-density polyethylene, and
    wherein the foam sheet is reeled in a rolled shape.

6. An interleaf sheet for glass plates, comprising the extruded polyethylene-based resin foam sheet according to claim 5.

7. The method for producing a polyethylene-based resin extruded foam sheet according to claim 1, wherein a resin component of the polyethylene-based resin consists essentially of low density polyethylene.

8. The method for producing a polyethylene-based resin extruded foam sheet according to claim 1, wherein a blend content of a resin other than low-density polyethylene contained in the polyethylene-based resin is 20 parts by mass or less per 100 parts by mass of low-density polyethylene.

* * * * *